United States Patent Office 3,709,946
Patented Jan. 9, 1973

3,709,946
PREPARATION OF ACETYLENIC ALCOHOLS
Robert J. Tedeschi, Whitehouse Station, and George L. Moore, South Plainfield, N.J., assignors to Air Products and Chemicals, Inc., Allentown, Pa.
No Drawing. Continuation of application Ser. No. 649,834, June 29, 1967. This application July 31, 1970, Ser. No. 64,128
Int. Cl. C07c 33/04, 33/06, 35/08
U.S. Cl. 260—617 E          1 Claim

ABSTRACT OF THE DISCLOSURE

An acetylenic alcohol is prepared by reacting a ketone with liquefied acetylene in the presence of a co-catalyst system comprising liquid ammonia and an alkali metal hydroxide.

---

This is a continuation of application S.N. 649,834 filed June 29, 1967 and now abandoned.

This invention relates to the preparation of hydroxy acetylenic compounds and is more particularly concerned with the preparation of acetylenic alcohols by a process involving the reaction of acetylene with a ketone in the presence of a co-catalyst system.

It has been heretofore proposed that acetylenic alcohols be prepared by the so-called Favorsky reaction by inter-reacting acetylene and a carbonyl compound in the presence of potassium hydroxide and in the presence of a reaction medium. Various solvents, such as ethers and polyethers, have been suggested as media in which this reaction may be conducted. By far the chief disadvantage of such prior processes has been the need to use at least stoichiometric amounts of potassium hydroxide, i.e., amounts of potassium hydroxide which were at least equimolecular, and generally significantly greater than equimolecular with respect to the amount of acetylenic alcohol formed. In other words, the combination of potassium hydroxide and the reaction media heretofore used had only limited activity with respect to effecting reaction between the acetylene and the carbonyl compound. The use of large amounts of potassium hydroxide is non-economic, and requires the recovery and processing of potassium hydroxide so that it may be reused. Therefore, the economics of these prior processes are dependent, in large measure, upon the capital investment necessary to process potassium hydroxide and the amount of potassium hydroxide required in the process. Tedeschi et al. U.S. Patent No. 3,082,260 provides a process of making acetylenic alcohols with only catalytic amounts of alkali metal hydroxides. However, in the process of that patent a solvent, i.e., liquid ammonia, is still required and, as in the case of all solvents, recovery and recycling of the solvent is necessary in order for the process to be commercially attractive. There is, therefore, still a need for a process of making acetylenic alcohols which uses only catalytic amounts of alkali metal hydroxides and which does not require the use of an added solvent medium.

It is, therefore, an object of this invention to provide an improved process for the preparation of acetylenic alcohols.

It is a further object of this invention to provide a process for making acetylenic alcohols which does not require the use of an added solvent medium. It is another object of the invention to provide a process of the character indicated which is commercially attractive.

In accordance with the present invention, it has been found that acetylenic alcohols can be prepared without the use of an added solvent by reacting a ketone with liquefied acetylene in the presence of a co-catalyst system comprising an alkali metal hydroxide and liquid ammonia.

In this process the liquefied acetylene functions both as a reactant and as a solvent medium, and the problems which are associated with the use of an added solvent medium, as in the prior art processes, are minimized.

In carrying out the process of this invention, the acetylene can be used in previously liquefied form or gaseous acetylene can be liquefied in the reaction vessel by introducing gaseous acetylene under pressure into the vessel cooled to a low temperature so that the acetylene is below its critical temperature. In a preferred procedure the alkali metal hydroxide is first introduced into the reaction vessel, which is, of course, a pressure vessel such as an autoclave, adapted to withstand the pressures encountered. The acetylene is then added followed by the liquid ammonia. Finally, the acetone is added and the mixture is stirred until reaction is complete. The time of reaction will vary, but ordinarily it will be complete within 0.5 to 4 hours. However, the above-mentioned reaction time is not limitative of the invention and shorter or longer times may be employed, as required.

While any ketone may be reacted with the liquefied acetylene in accordance with the present invention to prepare an acetylenic alcohol, the preferred ketones have the general formula

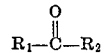

wherein $R_1$ and $R_2$ may be the same or different radicals selected from the group consisting of hydrogen, alkyl groups containing from 1 to 20 carbon atoms, preferably lower alkyl groups (up to 7 carbon atoms), cycloalkyl, such as cyclopropyl, cyclohexyl, and like cyclohexyl groups containing 3 to 10 carbon atoms, aryl, such as phenyl, tolyl, xylyl, and like aryl groups containing 6 to 12 carbon atoms and the monohydroxy and lower alkoxy derivatives of such compounds. $R_1$ and $R_2$ may also be joined to form a cycloalkyl ring containing 6 to 12 carbon atoms. Preferably at least one of $R_1$ and $R_2$ is not an aryl radical. Since the rate of reaction tends to decrease as $R_1$ and $R_2$ become larger it is preferred that the sum of $R_1$ and $R_2$ be at most about 12 carbon atoms.

The alkali metal hydroxide employed is preferably of about 90% or higher purity and finely-divided, i.e., 80–100 mesh or higher, and preferably contains less than 5% water. Less pure grades of alkali metal hydroxides or coarser alkali metal hydroxides may be used, although the reaction rate will tend to be somewhat slower and conversions will tend to be somewhat lower with these materials. As already pointed out above, any alkali metal hydroxide can be employed although increased conversions and yields are obtainable with potassium hydroxide and sodium hydroxide and they are preferred for this reason.

The ketone an the acetylene are used in at least equimolar quantities with an excess of acetylene being preferred, with the molar ratio between acetylene and ketone being most advantageously at least 2:1. Higher ratios can be used but generally there is no advantage in a ratio above 4:1. The alkali metal hydroxide is used in catalytic quantities, i.e., less than equimolar quantities with respect to the ketone, preferably at most about .5 mole per mole of ketone but at least .001 mole per mole of ketone. The liquid ammonia, on the other hand, is advantageously used in greater quantity ranging from about .1 mole to 2 moles per mole of ketone, preferably, however, at least .4 mole of liquid ammonia per mole of ketone is used.

Advantageously, the reaction zone is freed from air before the reactants and catalyst are introduced. This is suitably effected by sweeping the reaction zone with an inert gas, such as nitrogen. After the reaction is completed, excess acetylene and liquid ammonia are vented and removed, and the reaction mixture is hydrolyzed in the presence of an inert organic solvent, and the acetylenic alcohol obtained is separated. An inert organic solvent may be used for this purpose but preferably a lower alkyl ether is employed, i.e., an ether of the formula $R_3$—O—$R_4$ wherein $R_3$ and $R_4$ are the same or different alkyl radicals of 1–6 carbon atoms, such as diethyl ether, methyl ethyl ether, diisopropyl ether, and the like. Hydrolysis of the reaction mixture is readily accomplished by adding water to it, separating the water layer from the organic layer and then treating the layer or layers containing the acetylenic alcohol by carbonation with carbon dioxide, by acidification with a dilute mineral acid, such as dilute sulfuric acid or hydrochloric acid, by means of ion exchange resins, acid salts, or any of the other techniques well known in the art. Thus, in the case of water-soluble acetylenic alcohols, the water layer is treated and in the case of non-water-soluble acetylenic alcohols the organic layer is treated. In some cases, both may be treated alternatively. The reaction mixture can be treated directly with carbon dioxide after removal of ammonia without previous addition of water. The method by which the acetylenic alcohol is finally recovered will depend, primarily, upon the physical nature of the reaction mixture, and generally, will involve either extraction, e.g. with a lower alkyl ether or filtration and distillation. The reaction may be run batchwise or continuously.

The process of this invention is to be distinguished from processes employing the usual organic solvents used in reacting acetylene with a carbonyl compound, such as ethers, e.g., diethyl ether and diisopropyl ether. Even when such organic solvents are employed at gage pressures and at temperatures substantially above 0° C., more than equimolecular quantities of potassium hydroxide based upon the acetylenic alcohol, must be employed. Generally 2 to 3 times the equimolecular quantity of the alkali metal hydroxide are required under such conditions. Thus, in accordance with the process of the present invention, reaction is carried out at a temperature of −20° C. to 50° C. and at a pressure of 100 to 1000 pounds per square inch gage (p.s.i.g.), the pressure being greater the higher the temperature. Preferably, the temperature is at least 15° C. and the pressure at least about 400 p.s.i.g. and particularly advantageous results from the standpoint of high catalytic conversions and conversions of ketone are obtained at a temperature of 20° C. to 45° C. and at a pressure of 440 to 600 p.s.i.g.

The pressures referred to above are total pressures and represent ammonia pressure and the pressure of acetylene.

As mentioned, the reaction is suitably carried out in any reaction vessel adapted to be operated under gage pressure, such as an autoclave suitably jacketed for temperature control and provided with an agitator, and the components of the reaction mixture are introduced by the use of conventional supply means, such as cylinders or tanks. The amounts charged to the autoclave are advantageously determined by the use of conventional gauging or measuring devices such as scales or burets.

The liquid acetylene used in accordance with this invention can be readily prepared by introducing compressed gaseous acetylene into a cooled vessel from a gas cylinder or other source. Ordinary cylinders of acetylene are at a pressure of about 250 p.s.i.g. when full. The acetylene can be used directly from the cylinder but preferably the pressure of the acetylene is increased to about 400 p.s.i.g. before the liquefaction step by introducing the acetylene into a pressure vessel or accumulator and pumping mineral oil into the bottom of the vessel until the desired acetylene pressure is obtained. As previously mentioned, the liquefaction of the acetylene is most readily effected in the autoclave or other vessel in which the reaction of the invention is to be carried out. Thus, the compressed gaseous acetylene is introduced into the reaction vessel which is suitably cooled to a sufficiently low temperature to cause liquefaction of the acetylene. By using vapor pressure-temperature and density-temperature data such as found in V. J. Clancey, "Liquid and Solid Acetylene: A Review of Published Information" (England); Explosives Research and Development Establishment Survey 1/5/51, 1952, and in S. A. Miller "Acetylene," Academic Press, pp. 506–516 (1965), the temperature needed for liquefaction of acetylene at a given acetylene pressure can be readily ascertained. In general, with an acetylene pressure of about 400 p.s.i.g., a temperature of −10 to −30° C. is sufficient to allow rapid liquefaction of the acetylene. Cooling of the reaction vessel, which is, of course, supplied with appropriate cooling coils or a cooling jacket, is readily achieved by means of any suitable cooling medium, and a particularly effective cooling medium is methanol which has been cooled by circulation through coils immersed in secondary butanol, or a mixture of ethylene glycol and methanol, containing pieces of solid carbon dioxide (Dry Ice). Heating of the reaction vessel is easily effected by circulating the methanol through a body of warm water.

The invention will now be further illustrated by reference to the following specific examples, but it will be understood that the invention is not limited to these illustrative embodiments.

In the examples, unless otherwise indicated, the percentage conversion values given are based on "distilled conversion," i.e., the product as recovered from final distillation. Total conversion percentages, calculated on the basis of the product contained in the reaction mixture prior to the final distillation, are in all cases from 10 to 15% higher than the distilled conversion values.

EXAMPLE 1

The apparatus employed was a 125 ml. stainless steel, high-pressure autoclave, which was equipped with an inner coil and jacket cooling and a suitable stirrer. The autoclave was dried by warming to about 50° C. and sweeping with $N_2$ prior to adding the catalyst. Potassium hydroxide powder (1.18 g., 0.021 mole) was placed in the autoclave followed by assembling and pressure testing with $N_2$. Efficient cooling was effected by the use of a 2–3 gallon reservoir of ethylene glycol-methanol (1:1) in which a copper cooling coil was immersed. Copper lines from the coil exposed to the atmosphere and leading to the autoclave were insulated with fiber glass and vinyl tape. The methanol cooling liquid in the system was circulated by means of a pump. By continual introduction of small pieces of solid carbon dioxide into the reservoir a temperature of −40° C. was readily reached.

After cooling to −40° C., acetylene was condensed in the autoclave (39 cc. of liquid, 0.75 mole). The stirrer was turned on at this point. At −2° C. liquid ammonia (3.8 cc., 0.10 mole) was added in three minutes. Then the mixture was warmed slowly to room temperature. At 25° C. acetone (18.4 cc., 0.25 mole) was added over a period of 10 min. The temperature was increased to 35° C. and the mixture was stirred 2 hours. Pressure was maintained in the range of 480–570 p.s.i.g.

Di-iso-propyl ether (35 cc.) was added, and the gases were bled off. Liquid carbon dioxide (5 cc.) was added to neutralize the KOH-methyl butynol complex and the mixture was stirred 15 min.

The mixture was filtered to remove $KHCO_3$. The filtrate (74 g.) contained 6.2% unreacted acetone and 13.6% 3-methyl-1-butyn-3-ol. Di-iso-propyl ether was removed at atmospheric pressure by distilling through a column of about 15 theoretical plates. Distillation was carried out at still temperatures of 20° C.–110° C., while the head temperature varied from 56° C. to 104° C. After collecting a small forerun, 10.1 gr. of the desired 3-methyl-1-butyn-3-ol was collected at 103–104° C. (760 mm. Hg)

with a purity of 99.5%. Conversion to and yield of methyl butynol were 48.2% and 80%, respectively, based on acetone. Based on KOH the conversion was 573%.

EXAMPLE 2

Using apparatus such as employed in Example 1, potassium hydroxide powder (1.4 g., 0.025 mole) was placed in the reactor followed by assembling and pressure testing with $N_2$. The reactor was then cooled to —40° C. and acetylene was condensed in the autoclave (10 cc. of liquid, 0.20 mole). The stirrer was turned on. At about —2° C. liquid ammonia (8.4 cc., 0.22 mole) was added in three minutes. Then the mixture was warmed slowly to room temperature. At 25° C. acetone (11 cc., 0.15 mole) was added over a period of 10 min. The temperature was increased to 35° C. and the mixture was stirred 1.5 hours. Pressure was maintained in the range of 460–540 p.s.i.g.

Di-iso-propyl ether (35 cc.) was added, and the gases were bled off. Liquid carbon dioxide (5 cc.) was added to neutralize the KOH-methyl butynol complex and the mixture was stirred 15 min. The mixture was then worked up as described in Example 1. The pure 3-methyl-1-butyn-3-ol collected represented a conversion of 61% based on acetone. Based on KOH the conversion was 366%.

EXAMPLE 3

Operating as described in Example 2, potassium hydroxide powder (1.4 g., 0.025 mole) was placed in the reactor followed by assembling and pressure testing with $N_2$. The reactor was then cooled to —40° C. and acetylene was condensed in it (19 cc. of liquid, 0.37 mole). The stirrer was turned on and at —2° C. liquid ammonia (8.4 cc., 0.22 mole) was added in three minutes. Then the mixture was warmed slowly to room temperature. At 25° C. acetone (11 cc., 0.15 mole) was added over a period of 10 min. The temperature was increased to 35° C. and the mixture was stirred 1.5 hours. Pressure was maintained in the range of 440–515 p.s.i.g.

After working up the mixture as described in Example 1, the pure 3-methyl-1-butyn-3-ol collected represented a conversion of 87% based on acetone, and 600% based on KOH.

It is to be understood that the foregoing examples are merely illustrative and that other acetylenic alcohols can be prepared from other ketones, for example, 3-methyl-1-pentyn-3-ol can be prepared from liquid acetylene and methyl ethyl ketone, 3-ethyl-1-heptyn-3-ol can be prepared from liquid acetylene and ethyl butyl ketone, 1-ethynyl-cyclohexanol-1 can be prepared from acetylene and cyclohexanone, 3-phenyl-1-butyn-3-ol can be prepared from liquid acetylene and methyl phenyl ketone, and corresponding acetylenic alcohols can be prepared from ketones falling within the formula as set forth above.

It is further to be understood that various changes and modifications may be made in the process above described without departing from the scope of the present invention, as defined in the appended claim and it is intended, therefore, that all matter contained in the foregoing description shall be interpreted as illustrative only and not as limitative of the invention.

We claim:

1. A process for preparing an acetylenic alcohol which comprises reacting, at a temperature of —20° to 50° C. and at a pressure of 100 to 1000 p.s.i.g., a ketone having the formula:

wherein $R_1$ and $R_2$ are selected from the group consisting of alkyl radicals containing from 1 to 20 carbon atoms and aryl radicals containing from 6 to 12 carbon atoms, and wherein $R_1$ and $R_2$ together can constitute a cycloalkyl radical containing 6 to 12 carbon atoms, with liquefied acetylene—said acetylene acting simultaneously as a reactant and the solvent medium for the reaction—wherein the molar ratio of acetylene to ketone is at least 2:1, in the presence of a co-catalyst system comprising an alkali metal hydroxide present in the amount of 0.001 to 0.5 mole per mole of ketone and liquid ammonia which is present in the amount of about 0.1 to 2 moles per mole of ketone.

References Cited

UNITED STATES PATENTS 3,283,014   11/1966   Balducci et al. _____ 260—638 Y

HOWARD T. MARS, Primary Examiner

J. E. EVANS, Assistant Examiner

U.S. Cl. X.R.

260—618 E, 631 R, 635 Y, 638 Y, 643 R, 643 D, 643 F